(12) United States Patent
Moreland

(10) Patent No.: US 9,103,431 B2
(45) Date of Patent: Aug. 11, 2015

(54) TRANSMISSION SERVICE VENT FITTING

(75) Inventor: Calvin Joseph Moreland, Toledo, OH (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 426 days.

(21) Appl. No.: 13/168,475

(22) Filed: Jun. 24, 2011

(65) Prior Publication Data
US 2012/0325369 A1    Dec. 27, 2012

(51) Int. Cl.
*F16H 57/02* (2012.01)
*F16H 57/04* (2010.01)

(52) U.S. Cl.
CPC ........... *F16H 57/0408* (2013.01); *Y10T 408/03* (2015.01)

(58) Field of Classification Search
USPC ........................................ 74/606 R; 55/385.3
See application file for complete search history.

(56) References Cited

U.S. PATENT DOCUMENTS

| | | | | |
|---|---|---|---|---|
| 1,639,670 A | * | 8/1927 | Rydner | 55/419 |
| 3,422,982 A | * | 1/1969 | Myers et al. | 220/374 |
| 3,622,033 A | * | 11/1971 | Butler et al. | 220/371 |
| 6,015,444 A | | 1/2000 | Craft et al. | |
| 6,058,969 A | * | 5/2000 | Bollwahn et al. | 137/583 |
| 6,179,018 B1 | | 1/2001 | Erwin et al. | |
| 6,253,805 B1 | | 7/2001 | Erwin et al. | |
| 6,447,565 B1 | | 9/2002 | Raszkowski et al. | |
| 6,817,843 B2 | | 11/2004 | Leising et al. | |
| 7,044,150 B2 | | 5/2006 | Seidl | |
| 7,601,191 B2 | | 10/2009 | Droste et al. | |
| 8,454,719 B2 | * | 6/2013 | Tesner et al. | 55/385.3 |
| 2005/0166557 A1 | * | 8/2005 | Ramajo is et al. | 55/385.3 |

* cited by examiner

*Primary Examiner* — Vicky Johnson
(74) *Attorney, Agent, or Firm* — James Dottavio; MacMillan, Sobanski & Todd, LLC

(57) ABSTRACT

The present disclosure relates to a vehicle transmission service vent fitting with a hollow shaft insertable in a transmission housing, configured to allow a funnel nozzle to at least partially be inserted therein; and a release aperture formed in the shaft configured to enable exhaust from the transmission housing when the nozzle is at least partially inserted in the shaft and fluid passes through the nozzle.

20 Claims, 5 Drawing Sheets

TRANSMISSION SERVICE VENT FITTING

TECHNICAL FIELD

The present disclosure relates to vehicle transmission service vents and fittings for the same.

BACKGROUND

Conventional vehicle transmissions have a number of vents in the transmission housing to improve cooling during operation. These vents are designed to allow air to pass through the transmission without allowing oil to leak out. Oil is recycled within the transmission and acts as a lubricant and cooling agent during transmission operation. After so many miles of operation the oil may need to be replaced in an ordinary repair or service application. An existing vent can be used as an access point in the transmission housing to enable refill of oil. It would be beneficial to have a service vent fitting that enables ventilation of the transmission during fill.

Therefore, it is desirable to enable a service vent fitting to release air from the transmission housing while fluid is being added to the transmission.

SUMMARY

The present invention may address one or more of the above-mentioned issues. Other features and/or advantages may become apparent from the description which follows.

According to one exemplary embodiment, a vehicle transmission service vent fitting includes: a hollow shaft insertable in a transmission housing, the shaft configured to allow a funnel nozzle to at least partially be inserted therein; and a release aperture formed in the shaft configured to enable exhaust from the transmission housing when the nozzle is at least partially inserted in the shaft and fluid passes through the nozzle.

According to another exemplary embodiment, a vehicle component includes: a housing having a vent formed therein; and a vent fitting insertable in the vent. The vent fitting is configured to allow a funnel nozzle to be inserted therein. The fitting includes a release aperture configured to enable exhaust from the housing when the nozzle is inserted in the fitting and fluid passes through the nozzle.

In yet another exemplary embodiment, a method of manufacturing a vehicle transmission service vent fitting includes: forming a hollow shaft configured to fit in a transmission housing; and forming a release aperture in the shaft configured to enable exhaust from the transmission housing when a funnel nozzle is inserted in the shaft and fluid passes through the nozzle.

One advantage of the present teachings is that the use of the disclosed vent fitting(s) will allow a service technician to refill the transmission while allowing air to escape through the vent fitting.

The invention will be explained in greater detail below by way of example with reference to the figures, in which the same reference numbers are used in the figures for identical or essentially identical elements. The above features and advantages and other features and advantages of the present invention are readily apparent from the following detailed description of the best modes for carrying out the invention when taken in connection with the accompanying drawings. In the figures:

DETAILED DESCRIPTION

Figure 1:
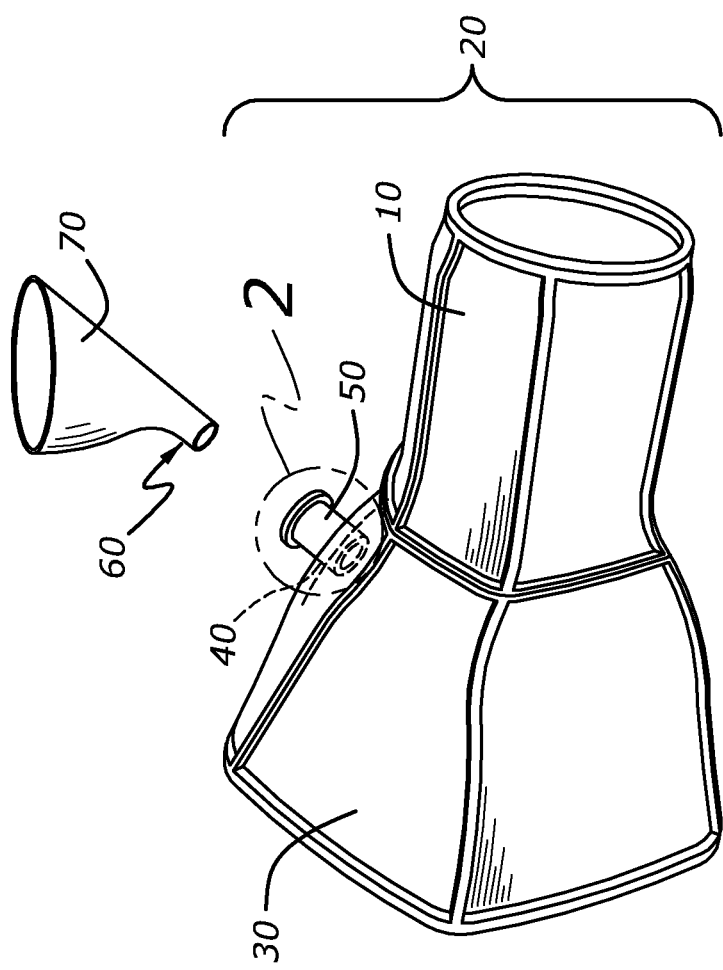
FIG. 1 is a side view of a vehicle transmission with a service vent fitting according to an exemplary embodiment of the present invention.

Referring to the drawings, wherein like characters represent the same or corresponding parts throughout the several views there is shown a vehicle transmission with exemplary service vent fittings. The fittings have multiple utility, having a hollowed shaft acting as an orifice or access point for receiving oil or transmission fluid while enabling the release of air from the transmission housing as oil is being added. The fittings include at least one release aperture formed in the body of the fitting.

Referring now to FIG. 1, there is shown therein a side view of a vehicle transmission housing 10. The transmission 20 is a standard six-speed, electrically variable transmission but can be any type of transmission. In a bell housing 30 for the transmission 20 there is formed therein a vent 40 which ventilates the interior of the transmission. The vent 40 allows for exhaust of air therethrough. In this arrangement, the vent 40 is located in an upper portion of the transmission housing 20. Vent 40 is a service vent that also enables a technician or operator to add oil to the transmission 20 through the vent. Vent 40 serves as an access point for fluid refill. The vent 40 is lined with a mechanical fitting 50. The fitting 50 extends from the interior of the transmission bell housing 30 to an exterior of the housing. The fitting 50 has a hollowed shaft that enables a nozzle 60 of a funnel 70 to be inserted in the fitting. During operation, the fitting 50 is sealed with an end cap (e.g., as discussed with respect to FIG. 5) that secures to one end of the fitting.

Figure 2:
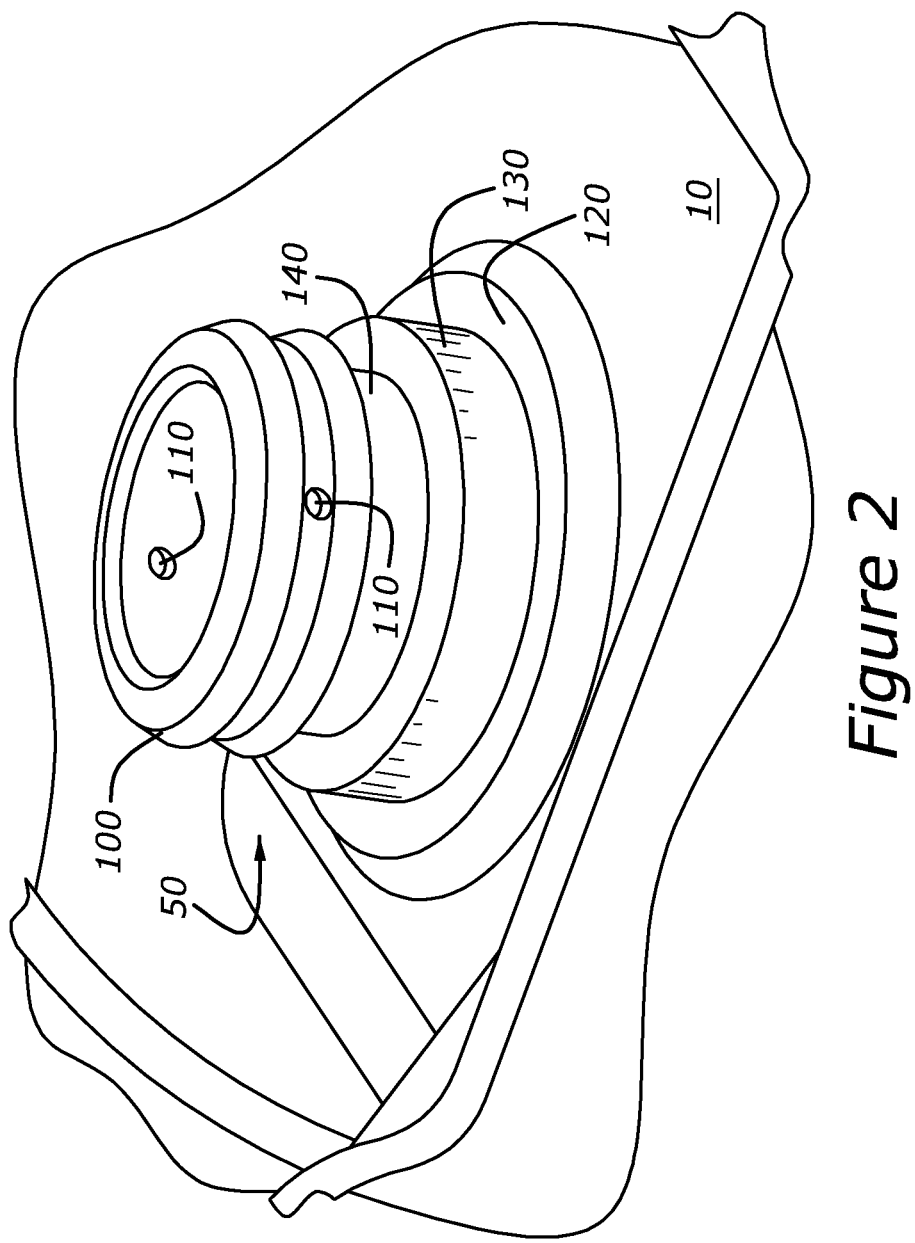
FIG. 2 is a perspective view of the service vent fitting of FIG. 1 taken from circle 2.
Figure 4:
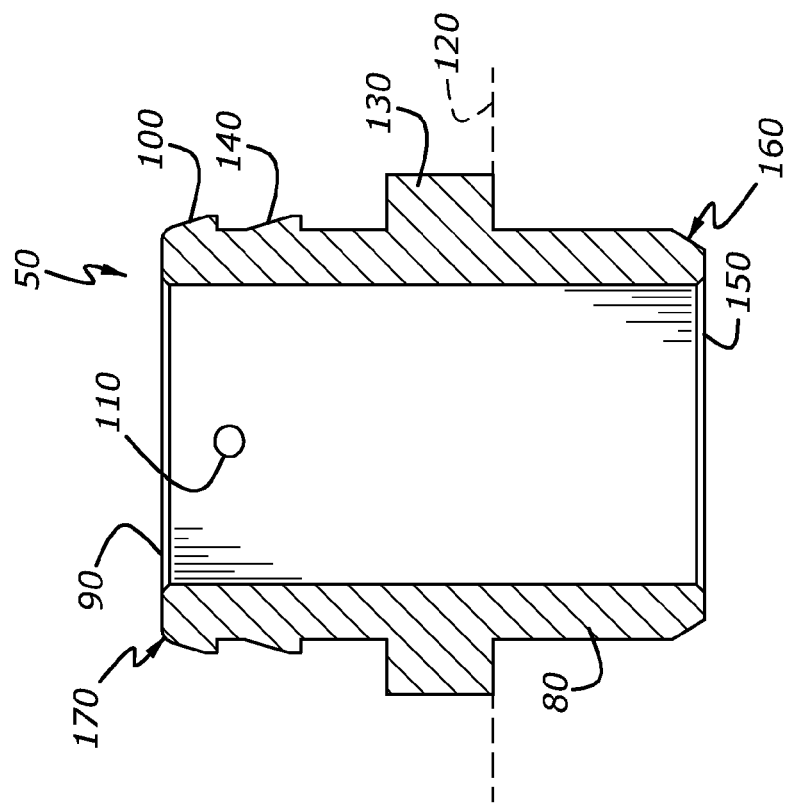
FIG. 4 is a cross-sectional view of the service vent fitting of FIG. 3 with cross-section taken through line 4-4.
Figure 3:
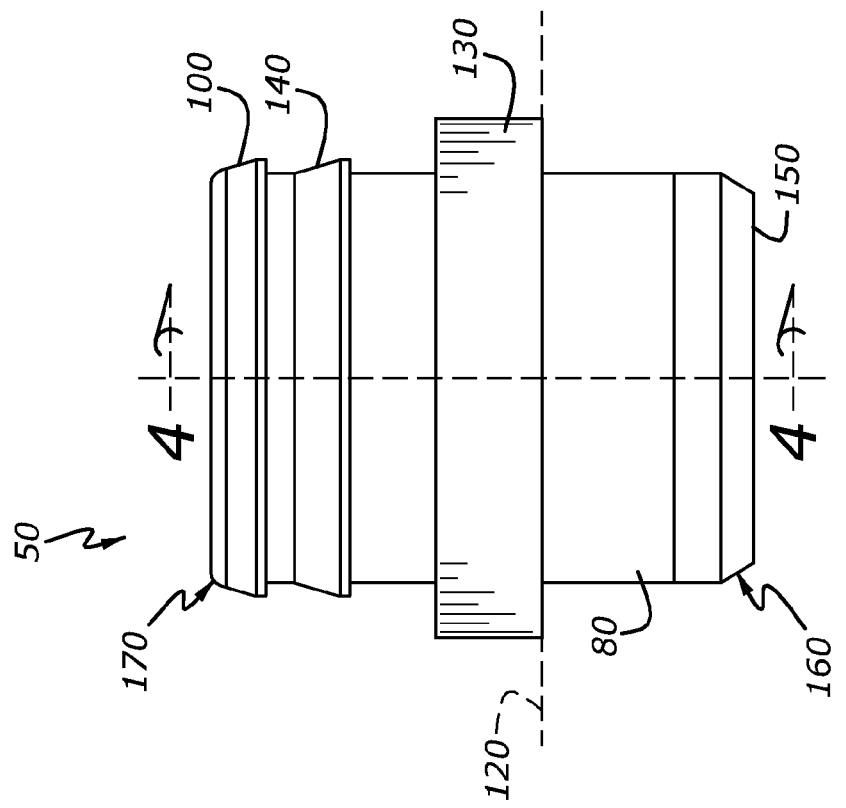
FIG. 3 is a side view of the service vent fitting of FIG. 2.

The fitting 50 of FIG. 1 is shown in greater detail with reference to FIGS. 2-4. FIG. 2 is a perspective view of the service vent fitting 50 of FIG. 1 taken from circle 2. The service vent fitting is shown inserted into the transmission housing 10. Vent fitting 50 includes a hollow shaft 80 that extends between the transmission housing 10 and the exterior of the transmission. The shaft 80 has a uniform inner diameter and a variable outer diameter (as shown in FIG. 4). At one end 90 of the shaft 80 there is located a rim 100. The rim 100 provides a surface to which an end cap secures and covers.

Also formed in the fitting 50, as shown in FIGS. 2 and 4, are two release apertures 110 configured to enable exhaust from the transmission housing 10 when a funnel nozzle is at least partially inserted in the shaft 80. Release apertures 110 act as a breather hole that allows air to exhaust from inside the transmission while the transmission 20 is being filled with oil. In this embodiment, the release apertures 110, as shown in FIGS. 2 and 4, are orifices or radially extending holes, with respect to a circumference of the shaft 80, drilled into the fitting 50 that allow air to escape while fluid is being added. Release apertures 110 are formed in an upper section of the fitting 50, closer to the external end 90 of fitting. In this manner release apertures 110 are formed in a section of the shaft 80 that sits outside of the transmission housing 10.

Release apertures 110 can vary in size. In this embodiment, release apertures 110 have a diameter of approximately 0.075".

In the embodiment illustrated in FIGS. 2-4, fitting 50 has a tiered outer diameter, progressively increasing from the release aperture 110 to an outer surface 120 of the transmission housing (as shown in FIG. 2). Collar 130 has a larger outer diameter than the outer diameter of collar 140. Rim 100 has an outer diameter approximately equal to the outer diameter of collar 140 but less than the outer diameter of collar 130. Collar 140 has a tapered surface. At end 150 of the shaft 80 the surface is tapered also thereby creating a chamfered edge 160. Rim 100 includes a rounded edge 170. In this embodiment, fitting 50 is composed of a metallic material, such as aluminum or an aluminum composite. Fitting 50 is symmetrical and is formed by a lathing process.

Figure 5:
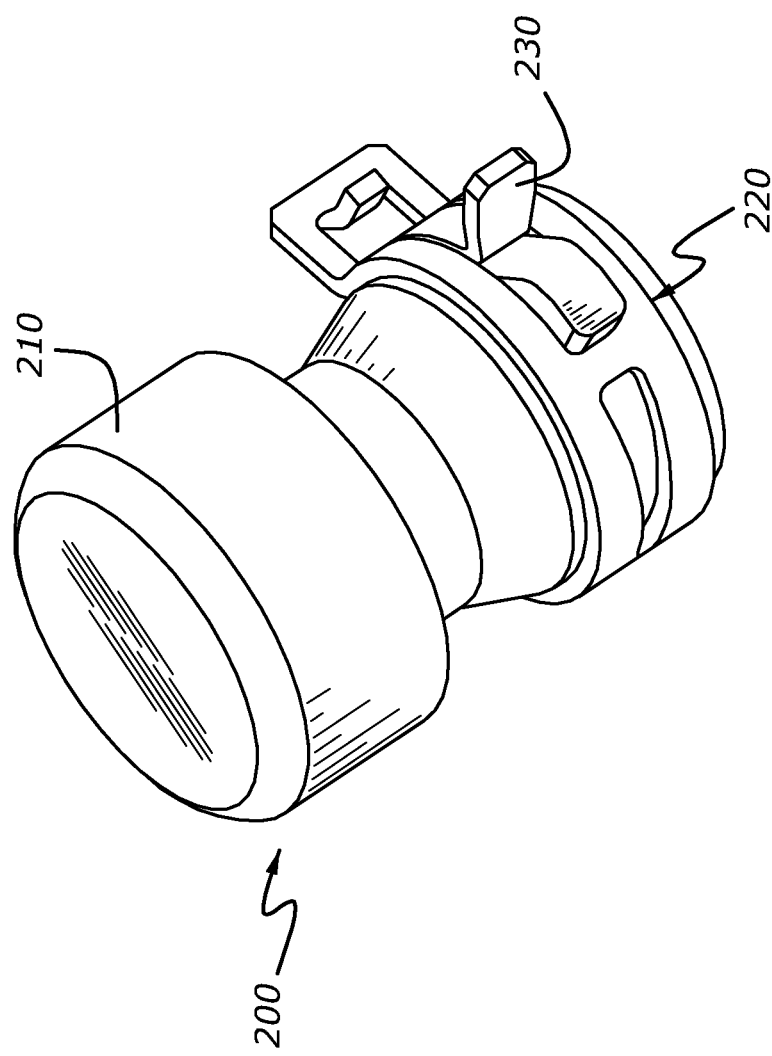
FIG. 5 is a perspective view of an end cap compatible with the service vent fitting of FIG. 2.

Fitting 50 is configured to mate with an end cap 200, as shown in FIG. 5, which illustrates a perspective view of the end cap. End cap 200 includes a mushroomed top 210 which can include instructions or service identifiers (as shown). At the other end 220 of the cap 200 is a clamp 230 formed with the cap to adjust the diameter of the cap when removed and affixed to the fitting 50. Cap 200 is removed from the fitting before the fill process occurs. The end cap 200 is formed in an injection molding process and is composed of an elastic material.

Figure 6:
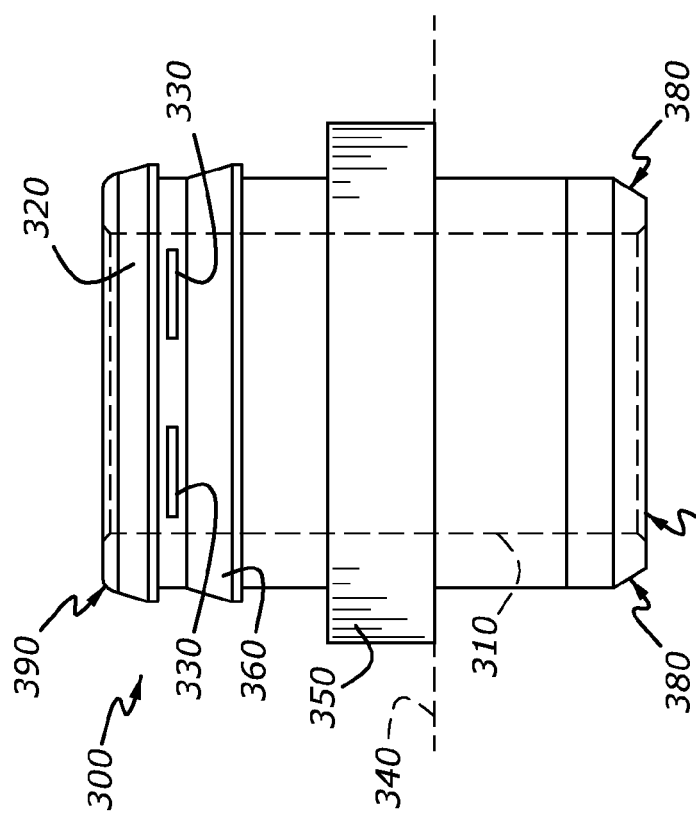
FIG. 6 is a side view of another service vent fitting according to another exemplary embodiment of the present invention.

Referring now to FIG. 6, shown therein is a side view of another exemplary embodiment of a service vent fitting 300. The service vent fitting 300 is shown removed from the transmission housing. Vent fitting 300 includes a hollow shaft 310 that extends between a transmission housing and an exterior of the transmission. The shaft 310 has a variable outer diameter. At one end of the shaft there is located a rim 320. The rim 320 provides a surface to which an end cap secures and covers.

The fitting 300, as shown in FIG. 6, includes two release apertures 330 configured to enable fluid exhaust from the transmission housing when a funnel nozzle is at least partially inserted in the shaft 310. In this embodiment, the release apertures 330 are slots cut out of the fitting 300 that allow air to escape while oil is being added. Release apertures 330 are formed in an upper section of the fitting 300, closer to the external end of fitting. Release apertures 330 are formed in a section of the shaft 310 that sits outside of the transmission housing. Release apertures can vary in size.

Fitting 300 has a tiered outer diameter, progressively increasing from the release apertures 330 to an outer surface of the transmission housing 340. Collar 350 has a larger outer diameter than the outer diameter of collar 360. Rim 320 has an outer diameter approximately equal to the outer diameter of collar 360 but less than the outer diameter of collar 350. Collar 360 has a tapered surface. At end 370 of the shaft 310 the outer surface is tapered also thereby creating a chamfered edge 380. Rim 320 includes a rounded edge 390.

Figure 7:
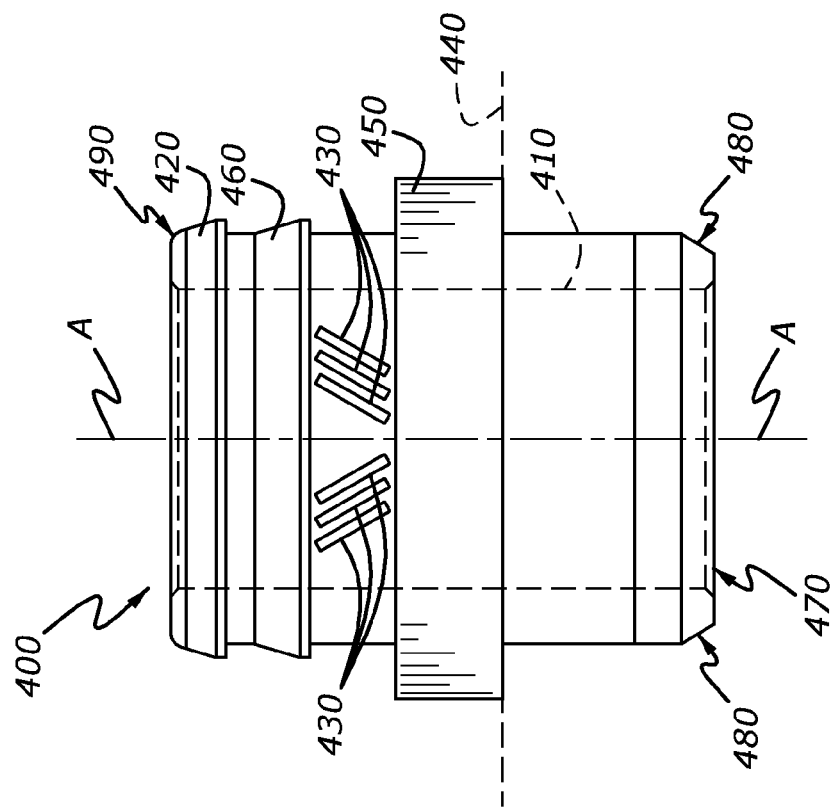
FIG. 7 is a side view of another service vent fitting according to another exemplary embodiment of the present invention.

Referring now to FIG. 7, there is shown therein a side view of another exemplary embodiment of a service vent fitting 400. The service vent fitting 400 is shown removed from the transmission housing. Vent fitting 400 includes a hollow shaft 410 that extends between a transmission housing and an exterior of the transmission. The shaft 410 has a variable outer diameter. At one end of the shaft there is located a rim 420. The rim 420 provides a surface to which an end cap secures and covers.

The fitting 400, as shown in FIG. 7, includes six release apertures 430, angularly aligned with respect to an axis, A, of the shaft. Release apertures 430 configured to enable fluid exhaust from the transmission housing when a funnel nozzle is at least partially inserted in the shaft 410. In this embodiment, the release apertures 430 are slots cut out of the fitting 400 that allow air to escape while oil is being added. Release apertures 430 are formed in an upper section of the fitting 400, closer to the external end of fitting. Release apertures 430 are formed in a section of the shaft 410 that sits outside of the transmission housing. Release apertures can vary in size.

Fitting 400 has a tiered outer diameter, progressively increasing from the release apertures 430 to an outer surface of the transmission housing 440. Collar 450 has a larger outer diameter than the outer diameter of collar 460. Rim 420 has an outer diameter approximately equal to the outer diameter of collar 460 but less than the outer diameter of collar 450. Collar 460 has a tapered surface. At end 470 of the shaft 410 the outer surface is tapered also thereby creating a chamfered edge 480. Rim 420 includes a rounded edge 490.

The illustrated release apertures are indicative of exemplary configurations for the release apertures. Other shapes, sizes and configurations for the release apertures can be incorporated in the vent fitting. In the illustrated embodiments, service vent fittings are composed of a metallic material, such as aluminum or an aluminum composite. Other material selections can be used for the fitting, including but not limited to steel, copper, titanium, or polymers. Fittings are formed from a lathing process but other manufacturing processes can be used to form fittings including, for example, molding, stamping, welding or extrusion. Also, fittings can be incorporated into other vehicle components beside the transmission including, for example, the engine, radiator, differentials, braking systems or any fluid reservoir.

A method of manufacturing a vehicle transmission service vent fitting is also disclosed herein. The method includes the steps of: (i) forming a hollow shaft configured to fit in a transmission housing (e.g., as shown in FIG. 1); and (ii) forming a release aperture in the shaft configured to enable exhaust from the transmission housing when a funnel nozzle is inserted in the shaft and fluid passes through the nozzle (e.g., as shown in FIGS. 2-5 and 6-7). In one embodiment of the method, forming a release aperture includes drilling a radial orifice in the shaft (e.g., as shown in FIGS. 2 and 4). In another embodiment of the method, forming the hollow shaft includes forming the shaft to have a variable outer diameter (e.g., as shown in FIGS. 2-5 and 6-7).

While the best modes for carrying out the invention have been described in detail, those familiar with the art to which this invention relates will recognize various alternative designs and embodiments for practicing the invention within the scope of the appended claims.

I claim:

1. A transmission service vent assembly, comprising:
   a hollow tube having a generally cylindrical wall with a first end in a transmission housing and a second end with an opening external to the housing, the opening configured to allow a funnel nozzle to be partially inserted therein, the tube including a radially outward extending tapered rim extending axially downward from the second end;
   an aperture spaced farther from the second end than the rim and extending through the longitudinal wall outside of the transmission housing and configured to enable exhaust from the transmission housing through the wall directly to atmosphere when the nozzle is at least partially inserted in the opening while fluid passes through the nozzle; and
   an elastic cap secured around the tube.

2. The assembly of claim 1, wherein the aperture is an orifice that extends radially with respect to the circumference of the tube.

3. The assembly of claim 1, wherein the aperture is a slot formed in the tube.

4. The assembly of claim 3, wherein the slot extends in a direction not parallel to an axis of the tube.

5. The assembly of claim 1, wherein the tube includes a radially outwardly extending collar spaced farther from the second end than the rim and resting against a surface of the transmission housing.

6. The assembly of claim 1, wherein the first end of the fitting includes a chamfered edge.

7. The assembly of claim 1, wherein the elastic cap is configured to prevent the funnel nozzle from being inserted when the cap is mounted on the tube.

8. The assembly of claim 1, wherein the elastic cap has an outer wall and the cap includes a clamp mounted on an outside surface of the outer wall that biases the outer wall of the cap against the tube to seal the opening.

9. A vehicle component, comprising:
a housing having a vent hole formed therein; and
a vent fitting including a hollow tube having a generally cylindrical wall mounted in the vent hole configured to allow a funnel nozzle to be inserted through an opening in a first end; an aperture through the wall, spaced from the first end and located outside of the housing and configured to enable exhaust from the housing through the wall directly to atmosphere when the nozzle is inserted in the opening and fluid passes through the nozzle; and a removable elastic cap mounted to seal the opening; and
wherein the tube includes a radially outward extending rim extending axially away from the first end and the aperture is spaced farther from the first end than the rim.

10. The vehicle component of claim 9, wherein the aperture is a slot.

11. The vehicle component of claim 10, wherein the slot extends in a direction not parallel to an axis of the fitting.

12. The vehicle component of claim 9, wherein the tube includes a radially outward extending collar spaced farther from the first end than the rim and mounted against a surface of the housing.

13. The vehicle component of claim 9, wherein a second end, opposite from the first end of the tube, is located in the housing and includes a chamfered edge.

14. The vehicle component of claim 9, wherein the tube includes a radially outward extending collar, spaced from the rim and spaced from an outside surface of the housing, with the aperture located between the rim and the collar.

15. The vehicle component of claim 9, wherein the tube includes a radially outward extending first collar mounted against an outer surface of the housing, and radially outward extending second collar between the rim and the first collar, and with the aperture located between the first and second collars.

16. The vehicle component of claim 9, wherein the elastic cap has an outer wall and the cap includes a clamp mounted on an outside surface of the outer wall that radially biases the outer wall of the cap against the tube to secure the cap to the tube.

17. A method of manufacturing a transmission service vent assembly, comprising:
forming a hollow tube having a generally cylindrical wall configured to mount to a transmission housing and having an opening at a first end outside of the housing and including a radially outward extending tapered rim extending axially downward from the first end;
forming an aperture in the wall, spaced farther from the first end than the rim and located outside of the transmission housing when the tube is mounted to the transmission housing, and configured to enable exhaust from the transmission housing through the tube directly to atmosphere when a funnel nozzle is inserted in the opening while fluid passes through the nozzle; and
forming a radially outwardly extending collar on the tube and securing an elastic cap to the tube, the elastic cap configured to seal the opening.

18. The method of claim 17, wherein the forming of the aperture includes drilling a radial orifice in the wall.

19. The method of claim 17, wherein the forming of the hollow tube includes forming the tube to have a variable outer diameter.

20. A vehicle component, comprising:
a housing having a vent hole formed therein; and
a vent fitting including a hollow tube having a generally cylindrical wall mounted in the vent hole configured to allow a funnel nozzle to be inserted through an opening in a first end; an aperture through the wall, spaced from the first end and located outside of the housing and configured to enable exhaust from the housing through the wall directly to atmosphere when the nozzle is inserted in the opening and fluid passes through the nozzle; and a removable elastic cap mounted to seal the opening; and
wherein the elastic cap has an outer wall and the cap includes a clamp mounted on an outside surface of the outer wall that radially biases the outer wall of the cap against the tube to secure the cap to the tube.

* * * * *